United States Patent [19]
Hisada et al.

[11] Patent Number: 5,304,880
[45] Date of Patent: Apr. 19, 1994

[54] WIRE CONNECTION STRUCTURE OF ELECTRIC ROTATING MACHINERY

[75] Inventors: Masahiko Hisada, Hekinan; Kazuaki Tsujita, Kosai, both of Japan

[73] Assignee: ASMO Co., Ltd., Kosai, Japan

[21] Appl. No.: 60,968

[22] Filed: May 14, 1993

[30] Foreign Application Priority Data

May 14, 1992 [JP] Japan .................... 4-38927

[51] Int. Cl.⁵ .................... H02K 11/00; H01J 5/00
[52] U.S. Cl. .................... 310/71; 174/50.52
[58] Field of Search .................... 310/40 MM, 43, 71; 174/50.5, 50.52, 50.56, 52.2, 176, 178, 179; 439/85, 271, 272, 606

[56] References Cited

U.S. PATENT DOCUMENTS

| | | | |
|---|---|---|---|
| 3,602,748 | 8/1971 | Locke | 310/71 |
| 3,604,264 | 9/1971 | Nowak | 73/228 |
| 4,075,758 | 2/1978 | Parsons et al. | 29/628 |
| 4,086,509 | 4/1978 | Manson | 310/232 |
| 4,101,794 | 7/1978 | Miller et al. | 310/71 |
| 4,104,550 | 8/1978 | Penhorwood | 310/71 |
| 4,781,600 | 11/1988 | Sugiyama et al. | 439/85 |
| 4,963,699 | 10/1990 | Urushibata et al. | 174/88 R |
| 5,198,962 | 3/1993 | Tyson | 174/52.2 |

FOREIGN PATENT DOCUMENTS

| | | | |
|---|---|---|---|
| 61-138361 | 8/1986 | Japan | 310/71 |
| 2-125561 | 10/1990 | Japan | 310/71 |
| 3-8063 | 2/1991 | Japan | 310/71 |
| 4-35655 | 3/1992 | Japan | 310/71 |

*Primary Examiner*—Steven L. Stephan
*Assistant Examiner*—Matthew Nguyen
*Attorney, Agent, or Firm*—Oblon, Spivak, McClelland, Maier & Neustadt

[57] ABSTRACT

An electric rotating machine has a wire connector to external wires. The wire connector has a connection box formed in the housing of the electric rotating machine and including an opening used to pour a filler into the connection box; a plurality of terminal fittings each connected at one end to the internal circuit of the electric rotating machine, the other end of each of the terminal fittings extending into the connection box through the wall thereof and being connected to the respective one of the external wires; and a waterproofing and insulating filler poured into and solidified in the connection box through the opening, each of the terminal fittings having wider side faces parallel to the direction of flow of the poured filler.

18 Claims, 4 Drawing Sheets

WIRE CONNECTION STRUCTURE OF ELECTRIC ROTATING MACHINERY

BACKGROUND OF THE INVENTION

1. Field of the Invention:

The present invention relates to an electric rotating machinery and particularly to such a machinery having a wire connector to external wires.

2. Description of the Related Art:

The electric rotating machinery including electric motors and generators are required to have sufficiently insulated and waterproofed connectors to external wires. Particularly, various types of motors used in automobiles for power-steering, power-windows, door locks and so on are expected to be used under various severe conditions. Therefore, the wire connectors used therein must be waterproofed and insulated sufficiently to withstand moisture, rainwater and so on.

FIGS. 4 and 5 show a power supply wire connector of DC motors for automobiles that is constructed in accordance with the prior art.

The power supply wire connector of the DC motor includes a connection box 12 formed in part of a motor housing 10. The connection box 12 has an open top. Inner wall of the connection box 12 has a pair of apertures 14 formed through the motor housing 10 to communicate with the interior thereof. The connection box 12 also includes a pair of terminal fittings 16 which extend into the interior of the connection box 12 through the respective apertures 14. The other end of each of the terminal fittings 16 is connected to the brush of a motor. The pair of terminal fittings 16 extend parallel to each other within the connection box 12 and have a top wider side face 16a directed to the open top. The end of each of the terminal fittings 16 that is placed within the connection box 12 is formed with a caulking pawl 18.

Within the connection box 12, the terminal fittings 16 are connected to a pair of external power supply wires 20 in the following manner.

The power supply wires 20 extend from the outside into the connection box 12. The inner end of each of the power supply wires 20 is caulked by the caulking pawl 18 of the corresponding terminal fitting 16 and soldered to provide a firm connection between the terminal fitting 16 and the power supply wire 20.

After provision of such a firm connection, a hot-melt adhesive 24 functioning as a waterproofing and insulating filler is poured through a nozzle 22 and solidified in the connection box 12. In such a manner, not only the connection between the terminal fittings 16 and the power supply wires 20 is electrically insulated from the surroundings, but also the apertures 14 for the terminal fittings are completely waterproofed to prevent any water from penetrating into the motor housing.

In the aforementioned power supply connection of the prior art, the terminal fittings 16 extend in the connection box 12 so that the top wider side faces 16a thereof are directed upwardly to the open top. Therefore, the wider side faces 16a of the terminal fittings 16 will be perpendicular to the direction of flow of the poured hot-melt adhesive 24 shown by arrow 200 in FIG. 5. As a result, the flow of the hot-melt adhesive 24 will be more resisted by the terminal fittings 16. It is thus difficult for the hot-melt adhesive 24 to flow into the backsides (bottom sides) of the terminal fittings 16. This tends to create spacings 26 in the backsides of the terminal fittings 16 which have no hot-melt adhesive 24. Such spacings 26 deteriorate the insulating and waterproofing properties in the connection box 12. In addition, the water may undesirably enter the motor housing 10 through the gaps between the terminal fittings 16 and the apertures 14 via the spacings 26.

Further, the soldering material between the terminal fittings 16 and the power supply wires 20 may be undesirably formed into such a configuration as obstructing the down-flow of the hot-melt adhesive 24. This also tends to form the spacings 26 below the terminal fittings 16 to reduce the insulating and waterproofing properties in the connection box 12.

SUMMARY OF THE INVENTION

It is therefore an object of the present invention to provide an electric rotating machine which has a wire connector improved in insulation and waterproofness by filling the connection box with a waterproofing and insulating filler without any spacing.

To this end, the present invention provides an electric rotating machine having a wire connector to external wires, said wire connector comprising a connection box formed in the housing of the electric rotating machine and including an opening used to pour a filler into the connection box; a plurality of terminal fittings each connected at one end to the internal circuit of the electric rotating machine, the other end of each of said terminal fittings extending into the connection box through an aperture formed in the wall of said connection box and being connected to the respective one of the external wires extending to said connection box; and a waterproofing and insulating filler poured into and solidified in said connection box through said opening, each of said terminal fittings being placed with its wider side faces parallel to the direction of flow of the poured filler.

The present invention also provides an electric rotating machine having a wire connector to external wires, said wire connector comprising a connection box formed in the housing of the electric rotating machine and including an opening used to pour a filler into the connection box; a plurality of terminal fittings each connected at one end to the internal circuit of the electric rotating machine, the other end of each of said terminal fittings extending into the connection box through an aperture formed in the wall of said connection box and being connected to the respective one of the external wires extending to said connection box; and a waterproofing and insulating filler poured into and solidified in said connection box through said opening, each of said terminal fittings having narrower side faces defining the thickness of said terminal fitting being disposed against the direction of flow of the poured filler.

Since each of the terminal fittings has narrower side faces that define the thickness of that terminal fitting being disposed against the direction of flow of the poured filler, the flow of the poured filler will not substantially be obstructed by the terminal fittings and can be filled in the connection box without any spacing.

Therefore, the wire connector in the electric rotating machine of the present invention can have reliable waterproof and insulation in the connection box.

It is preferred that the connection box is partitioned into two chambers, that is, a first chamber positioned adjacent to the apertures receiving the terminal fittings and a second chamber containing the wire connection.

In such an arrangement, even if the solder material connecting the terminal fittings with the external wires is formed into such a configuration as obstructing the flow of the poured filler, its affection can be limited to the second chamber. In the first chamber, the filler can be fully filled in the connection box around the terminal fittings without any spacing, this provides a perfect waterproof.

DETAILED DESCRIPTION OF THE PREFERRED EMBODIMENT

Figure 2:
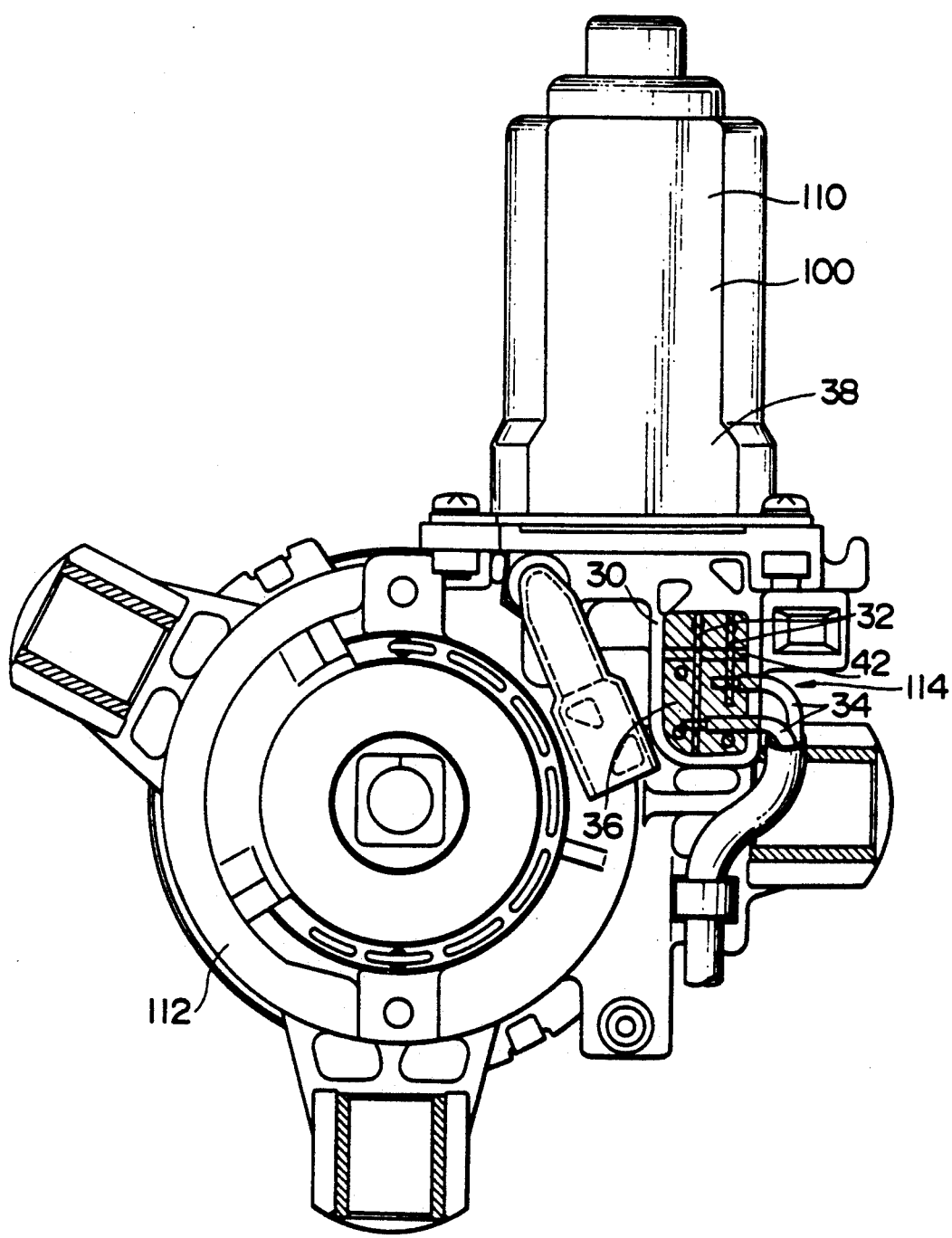
FIG. 2 is a front view of a DC motor using the power supply wire connector shown in FIG. 1.

Referring to FIG. 2, there is shown an automobile DC motor to which the present invention was applied. The automobile DC motor 100 comprises a motor part 110 and a speed reduction part 112 for reducing and outputting the rotation of the motor part 110 at a predetermined reduction ratio. The motor part 110 and the speed reduction part 112 have a common motor housing 38.

The automobile DC motor 100 includes a wire connector 114 formed in part of the motor housing 38. The wire connector 114 is connected to a pair of power supply wires 34 which supply a DC voltage to the motor brush in the motor housing 38 to energize the motor part 110.

The details of the wire connector 114 will now be described below.

The wire connector 114 includes a connection box 30, a pair of terminal fittings 32 and a hot-melt adhesive 36 functioning as a filler.

Figure 1:
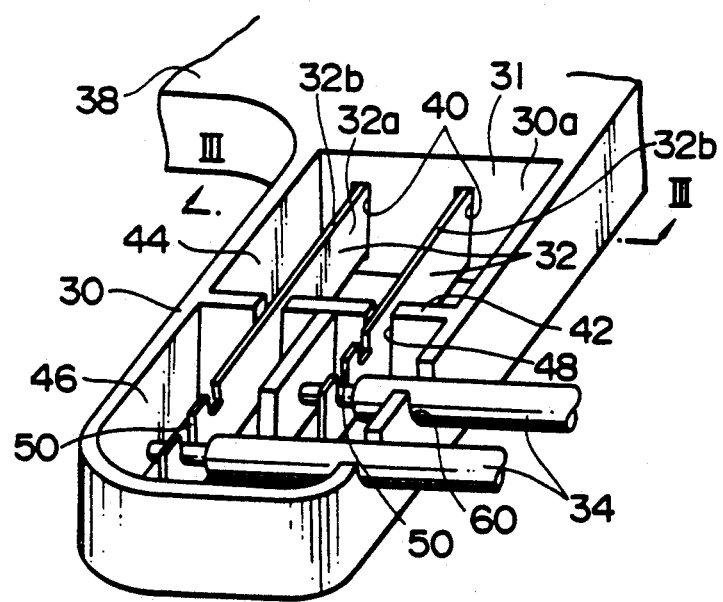
FIG. 1 is a perspective view of one embodiment of a power supply wire connector constructed in accordance with the present invention and usable in an automobile DC motor.

As shown in FIG. 1, the connection box 30 is formed in part of the motor housing 38 to have an open top. The connection box 30 has one inner wall 30a through which a pair of apertures 40 are formed in the form of elongated slots extending in the direction of depth of the connection box 30. The apertures 40 are formed to enable the interior of the connection box 30 to communicate with the interior of the motor housing 38. The connection box 30 is divided substantially into two chambers, that is, a chamber 44 adjacent to the apertures 40 and another chamber 46 housing the power supply wire connection, by a partitioning wall 42 that extends in a direction across the terminal fittings 32. The partitioning wall 42 is formed with grooves 48 for receiving the terminal fittings 32.

At the wire connection chamber 46, the connection box 30 includes a pair of wire leading-in grooves 60 formed in the side wag thereof at the top edge so that a pair of power supply wires 34 can be led into the connection box 30 through the wire leading-in grooves 60 in a direction perpendicular to the terminal fittings 32.

Figure 3:
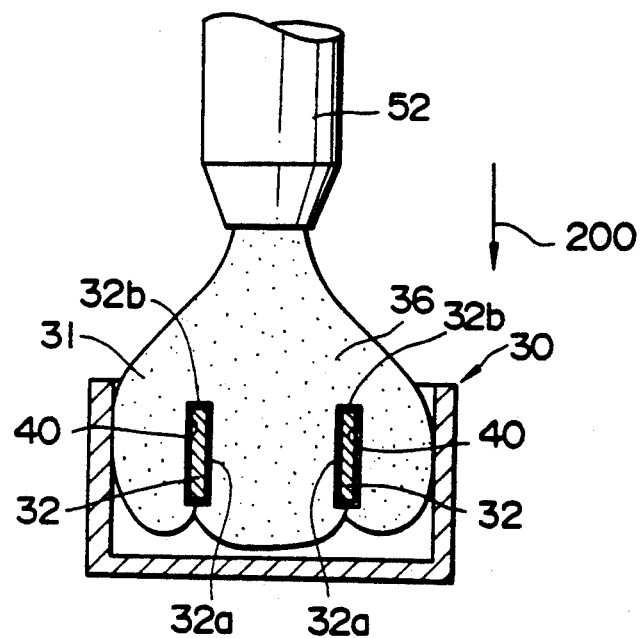
FIG. 3 is a cross-sectional view taken along a line III—III in FIG. 1, illustrating a hot-melt adhesive being poured into the connection box.
Figure 4:
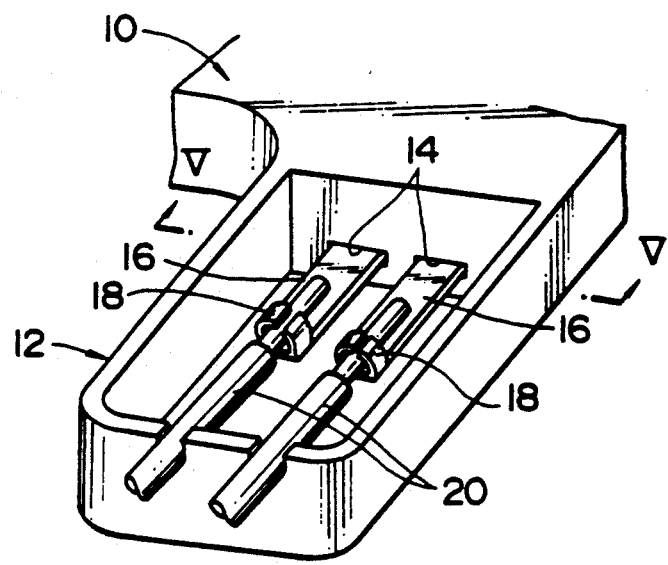
FIG. 4 is a perspective view of a power supply wire connector in an automobile DC motor constructed in accordance with the prior art.
Figure 5:
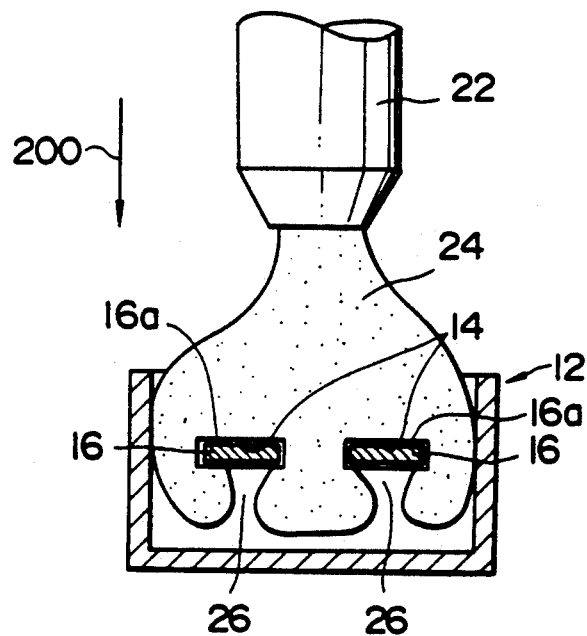
FIG. 5 is a cross-sectional view taken along a line V—V in FIG. 4, illustrating a hot-melt adhesive being poured into the connection box.

Each of the terminal fittings 32 is connected at one end to the brush of the motor part 110 within the motor housing 38. The other end of the terminal fitting 32 extends into the connection box 30 through the corresponding aperture 40 formed in the inner wall 30a of the connection box 30. Each of the apertures 40 is in the form of an elongated slot that has a length extending from a position adjacent to the closed bottom of the connection box 30 to a position adjacent to the open top 31 thereof. As best seen in FIGS. 1 and 3, therefore, the pair of terminal fittings 32 extending into the connection box 30 through the apertures 40 will be disposed in the connection box 30 with the wider side faces 32a of one terminal fitting 32 being parallel to those of the other terminal fitting 32. In other words, the narrower side faces 32b of the terminal fittings 32, each of which defines the thickness of the associated terminal fitting, will be disposed against the direction of flow of the poured filler. Therefore when the hot-melt adhesive 36 is poured into the connection box 30 as will be described, the wider side faces 32a of the terminal fittings 32 will be in parallel to the direction of flow 200 of the poured hot-melt adhesive 36.

Each of the terminal fittings 32 includes its tip end formed with a caulking recess 50 for the associated power supply wire 34. Terminal fittings 32, which go through the grooves 48 in the partitioning wall 42 and reach the wire connection chamber 46 at their ends, have one of the tips reaching further into the wire connection chamber 46 than the other so that connections with power supply wires will not be interfered.

After the power supply wires 34 have been led into the wire connection chamber 46 of the connection box 30 through the leading-in grooves 60 in the direction perpendicular to the terminal fittings 32, each of the power supply wires 34 is engaged and caulked in the recess 50 of the corresponding terminal fitting 32. The caulking portion between each of the terminal fittings 32 and the associated power supply wire 34 is soldered to provide a firm connection.

The hot-melt adhesive 36 functions to waterproof and insulate the power supply wire connection thus formed. As shown in FIG. 3, the hot-melt adhesive 36 is poured, under its molten state, from a nozzle 52 through the top opening 31 of the connection box 30 into the two chambers 44 and 46 of the connection box 30. Subsequently, the hot-melt adhesive 36 is solidified in the connection box 30.

More particularly, after the terminal fittings 32 have been caulked and soldered against the power supply wires 34 within the wire connection chamber 46, the hot-melt adhesive 36 is then poured from the nozzle 52 into the chambers 44 and 46. Since the wider side faces 32a of the terminal fittings 32 are disposed parallel to the direction of flow of the poured hot-melt adhesive 36, the hot-melt adhesive 36 flows with little obstruction and fills in the chambers 44 and 46 of the connection box 30. In such a manner, the gaps between the terminal fittings 32 and the apertures 40 in the wail of connection box 30 can be perfectly and reliably sealed by the hot-melt adhesive 36. Further, the connection between the terminal fittings 32 and the power supply wires 34 can reliably and perfectly be insulated from their surroundings by the hot-melt adhesive 36.

Even if the solder material between the terminal fittings 32 and the power supply wires 34 is formed into such a configuration as obstructing the flow of the hot-melt adhesive 36, its affection is limited to the wire connection chamber 46, rather than the chamber 44 adjacent to the apertures 40 of the connection box 30 through which the terminal fittings 32 extend. Therefore, the gaps between the terminal fittings 32 and the inner walls of the apertures 40 can perfectly be sealed by the hot-melt adhesive 36 to provide a reliable waterproof.

The present invention is not limited to the aforementioned embodiment, but may be carried out in any one of various modified forms within the scope of the invention.

For example, the present invention may be applied to any one of various motors requiring the insulating and waterproofing properties. Further, the present invention may similarly be applied to any electric generator requiring the waterproof and insulating properties.

In accordance with the present invention, the wider side faces 32a of the terminal fittings 32 may be disposed slightly inclined relative to the direction of flow of the poured hot-melt adhesive 36.

We claim:

1. An electric rotating machine having a wire connector to external wires, said wire connector comprising:
    a connection box formed in a housing of the electric rotating machine, said connection box including an opening for receiving a poured filler into the connection box;
    a plurality of terminal fittings each having a first end connected to an internal circuit of the electric rotating machine and a second end extending into the connection box through apertures formed in a wall of said connection box, the second end of each of said terminal fittings being connected to a respective one of the external wires; and
    a waterproofing and insulating filler poured into and solidified in said connection box through said opening;
    wherein:
        each of said terminal fittings comprise wide and narrow side faces, with said wide side faces being positioned parallel to a direction of flow of said poured filler.

2. An electric rotating machine as defined in claim 1, wherein said filler includes a hot-melt adhesive.

3. An electric rotating machine as defined in claim 1, wherein said terminal fittings are soldered to said external wires after said terminal fittings have been caulked.

4. A DC machine as defined in claim 1, wherein each of said terminal fittings is connected at one end to the brush of said DC machine.

5. An electric rotating machine having a wire connector to external wires, said wire connector comprising:
    a connection box formed in a housing of the electric rotating machine, said connection box including an opening for receiving a poured filler into the connection box;
    a plurality of terminal fittings each having a first end connected to an internal circuit of the electric rotating machine and a second end extending into the connection box through apertures formed in a wall of said connection box, the second end of each of said terminal fittings being connected to a respective one of the external wires; and
    a waterproofing and insulating filler poured into and solidified in said connection box through said opening;
    wherein:
        each of said terminal fittings comprise narrow side faces which define a thickness of said terminal fittings and are disposed against a direction of flow of the poured filler.

6. An electric rotating machine as defined in claim 5, wherein said filler includes a hot-melt adhesive.

7. An electric rotating machine as defined in claim 5, wherein said terminal fittings are soldered to said external wires after said terminal fittings have been caulked.

8. A DC machine as defined in claim 5, wherein each of said terminal fittings is connected at one end to the brush of said DC machine.

9. An electric rotating machine having a wire connector to external wires, said wire connector comprising:
    a connection box formed in a housing of the electric rotating machine, said connection box including an opening for receiving a poured filler into the connection box;
    a plurality of terminal fittings each having a first end connected to an internal circuit of the electric rotating machine and a second end extending into the connection box through apertures formed in a wall of said connection box, the second end of each of said terminal fittings being connected to a respective one of the external wires; and
    a waterproofing and insulating filler poured into and solidified in said connection box through said opening;
    wherein:
        each of said terminal fittings comprise wide and narrow side faces, with said wide side faces being positioned parallel to a direction of flow of said poured filler; and
        said connection box includes a partitioning wall which separates said connection box into a first chamber adjacent to said apertures of said connection box through which said terminal fittings extend, and a second chamber which houses the wire connections of the terminal fittings to the external wires.

10. An electric rotating machine as defined in claim 9, wherein said second chamber includes a wall formed with a wire leading-in portion for leading said external wires into the interior of said second chamber in a direction perpendicular to said terminal fittings.

11. An electric rotating machine as defined in claim 10, wherein said filler includes a hot-melt adhesive.

12. An electric rotating machine as defined in claim 11, wherein said terminal fittings are soldered to said external wires after said terminal fittings have been caulked.

13. An electric rotating machine as defined in claim 12, wherein each of said terminal fittings is connected at one end to the brush of said DC machine.

14. An electric rotating machining having a wire connector to external wires, said wire connector comprising:
    a connection box formed in a housing of the electric rotating machine, said connection box including an opening for receiving a poured filler into the connection box;
    a plurality of terminal fittings each having a first end connected to an internal circuit of the electric rotating machine and a second end extending into the connection box through apertures formed in a wall of said connection box, the second end of each of said terminal fittings being connected to a respective one of the external wires; and a waterproofing and insulating filler poured into and solidified in said connection box through said opening;

wherein:

each of said terminal fittings comprise narrow side faces which define a thickness of said terminal fittings and are disposed against a direction of flow of the poured filler; and said connection box includes a partitioning wall which separates said connection box into a first chamber adjacent to said apertures of said connection box through which said terminal fittings extend, and a second chamber which houses the wire connections of the terminal fittings to the external wires.

15. An electric rotating machine as defined in claim 14, wherein said second chamber includes a wall formed with a wire leading-in portion for leading said external wires into the interior of said second chamber in a direction perpendicular to said terminal fittings.

16. An electric rotating machine as defined in claim 15, wherein said filler includes a hot-melt adhesive.

17. An electric rotating machine as defined in claim 16, wherein said terminal fittings are soldered to said external wires after said terminal fittings have been caulked.

18. A DC machine as defined in claim 17, wherein each of said terminal fittings is connected at one end to the brush of said DC machine.

* * * * *